Nov. 11, 1930.  J. L. GREEN  1,781,638
FLUID AIR CLEANER
Filed June 26, 1929   2 Sheets-Sheet 1

John L. Green,
INVENTOR

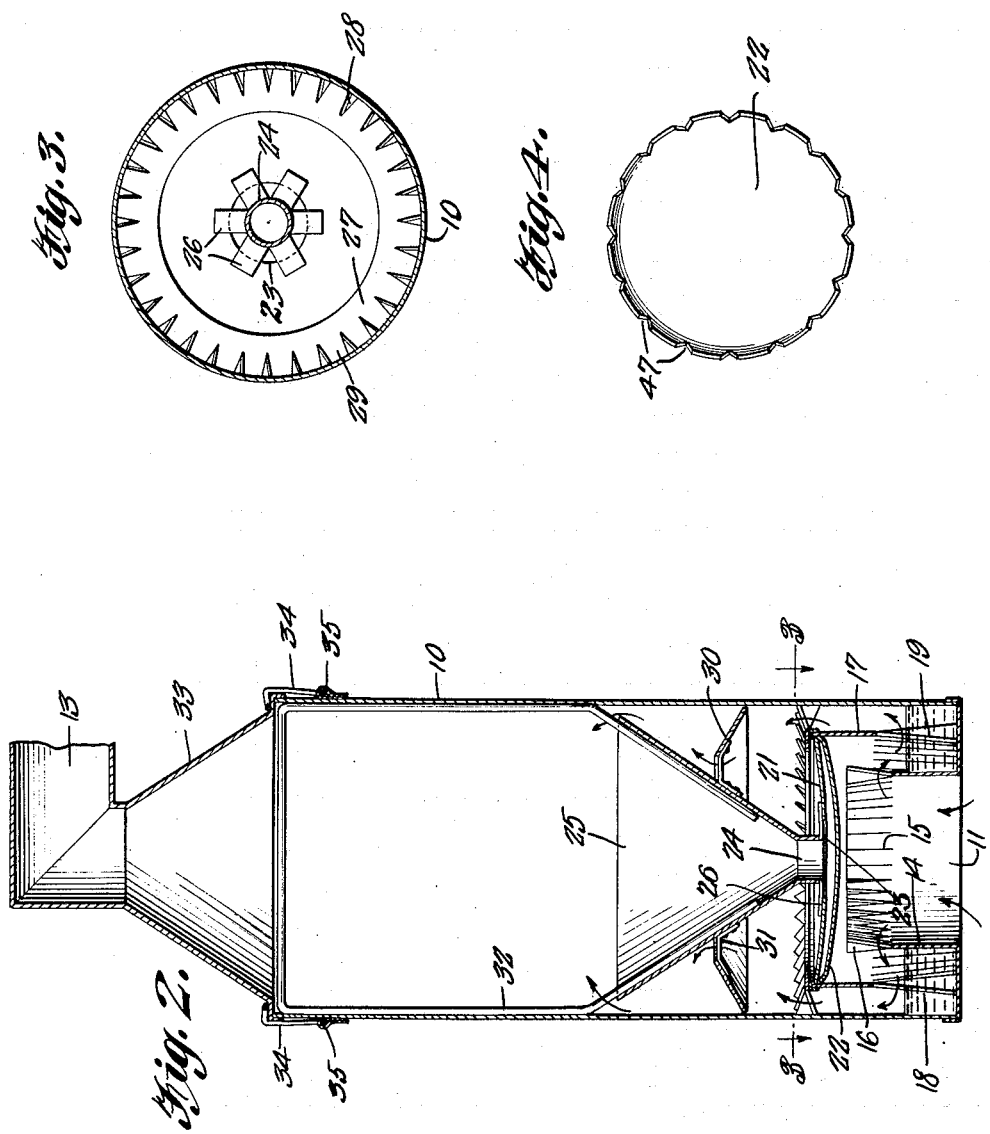

Patented Nov. 11, 1930

1,781,638

UNITED STATES PATENT OFFICE

OHN L. GREEN, OF EL DORADO, ARKANSAS

FLUID AIR CLEANER

Application filed June 26, 1929. Serial No. 373,871.

This invention relates to improvements in internal combustion engines, an object being to provide means for supplying thoroughly cleaned air to the carbureter of the engine for mixture with the liquid fuel, so as to protect the working parts of the engine from dirt, grit and other extraneous matter.

Another object of the invention is the provision of means for supplying clean air to the engine cylinders in such manner that the air supply will also provide an air circulation through the crank case of the engine and thereby reduce the temperature of lubricating oil in the crank case and increase the life of the oil. In addition, the manner of supplying air to the engine will assist in cooling the engine bearings, lubricate the cylinder walls, pistons and rings by carrying into the cylinders oil vapor from the crank case, as well as prevent the accumulation of carbon and increase the fuel mileage and power of the engine.

Another object of the invention is the provision of a novel form of air cleaner in which a film of oil is distributed over the inner parts of the cleaner, in which baffles are arranged to cause the dust and small particles of dirt to be collected by the oil so distributed, and the dust and dirt will not reach the engine cylinders.

Another object of the invention is the provision of an air cleaner which may be readily taken apart and cleaned and thereafter quickly reassembled.

With the above and other objects in view, the invention further includes the following novel features and details of construction, to be hereinafter more fully described, illustrated in the accompanying drawings and pointed out in the appended claims.

In the drawings:—

Figure 2 is an enlarged sectional view of the cleaner per se.

Figure 3 is a section on the line 3—3 of Figure 2.

Figure 4 is a plan view of the dish-shaped member.

Figure 1:
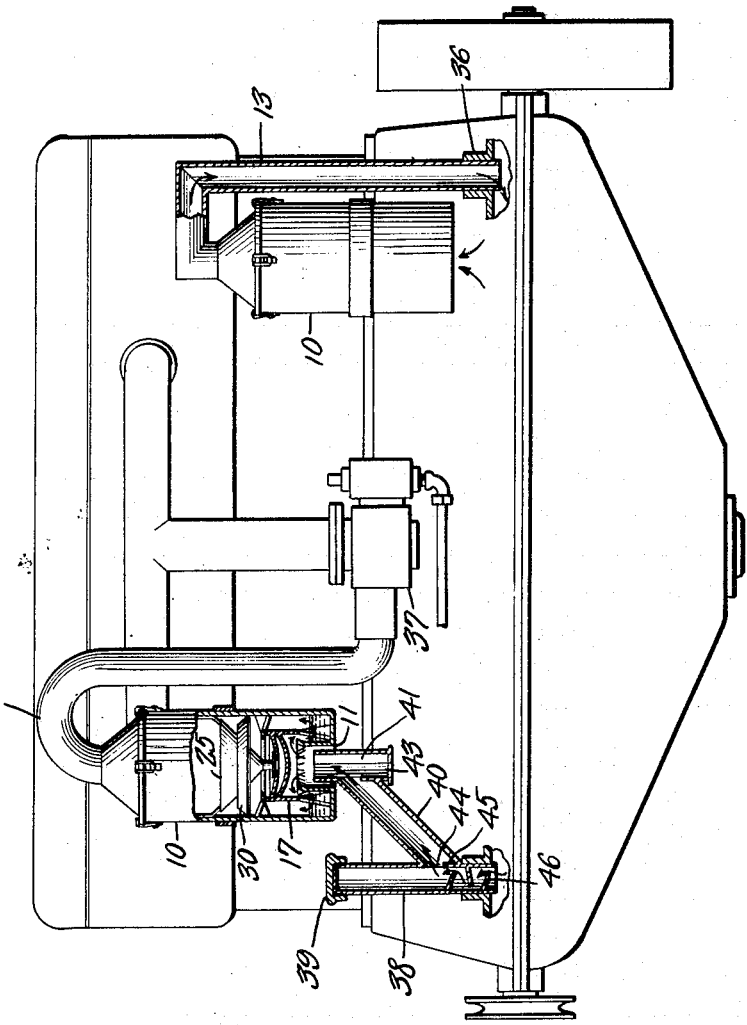
Figure 1 is a side elevation of an internal combustion engine with parts broken away and shown in section to more clearly illustrate the invention.

In carrying out the invention use is made of an air cleaner somewhat similar to that disclosed in application Serial No. 279,585, filed by me May 21, 1928.

The cleaner as shown comprises a housing 10 which is provided with an intake opening 11 and an outlet opening which communicates with one end of a pipe 12, or with a pipe 13 as shown in Figure 1 of the drawings.

The intake opening 11 is surrounded by a flange or thimble 14 which extends upwardly within the housing and which is slitted as shown at 15 to provide blades 16 between the slits. The thimble is surrounded by a trap 17 which is substantially cup-shaped and is inverted over the end of the thimble 14. The side walls of the trap 17 are slitted as shown at 18 so that the material between the slits defines a series of downwardly extending blades 19 which are arranged within a fluid reservoir 20 defined by the bottom and side walls of the housing and the thimble 14. The trap 17 is provided in its top with spaced walls 21 and 22. These walls are substantially dish shaped and the upper wall 21 is provided with a central opening 23 from which rises the restricted end 24 of a funnel-shaped member 25. This funnel-shaped member provides a combined funnel and baffle and extends upwardly and is spaced from the casing so as to provide an annular air passage between the upper edge of the funnel and the casing. A spider 26 connects the funnel with the upper wall 21 and as the walls 21 and 22 are connected with the trap 17, these parts form a part of a removable unit.

An annulus 27 surrounds the upper edge of the trap 17 and this annulus is radially slitted as shown at 28 so as to provide blades 29. The blades 16, 19 and 29 are angularly arranged as shown so that the slits between the blades form passages.

An inclined annular baffle ring 30 is positioned between the top of the trap 17 and the upper edge of the funnel 25 and is secured to the funnel by means of arms 31.

A bail 32 has its opposite ends secured within the funnel 25 and this bail extends upward to the top of the casing. The top of the casing is provided with a cover 33 from which the pipe 12 extends. This cover is removably held in place by means of clamps 34 which are pivotally mounted upon the casing as shown at 35. By removing the cover 33, all of the parts within the casing may be removed as a unit, except the thimble 14.

As previously stated, one of the objects of the invention is to supply thoroughly cleaned air to the engine cylinders in a manner to assist in cooling the engine bearings, lubricate the cylinder walls, etc. For this purpose, two air cleaners are provided. One of these cleaners is in communication with an air intake port 36 provided in the crank case of the engine, through the medium of the pipe 13. The other cleaner is in communication with the carbureter 37 through the pipe 12.

In the present invention use is made of the opening through which oil is usually introduced into the crank case, and this opening has extending therefrom a pipe 38 which is provided with a removable cap 39, so that oil may be introduced in the usual manner. Extending from this pipe 38 is an upwardly inclined pipe 40 which is in communication with a pipe 41 whose upper end extends into the thimble 14. The lower end of the pipe 41 is closed and extends downward below the pipe 40, a restricted opening 42 providing communication between the pipes 40 and 41. A dirt or sediment trap 43 is thus formed in the bottom of the pipe 41. The lower end of the pipe 40 communicates with the pipe 38 through a restricted opening 44 so that an additional dust and dirt trap 45 is provided between the crank case of the engine and the air cleaner. Baffles 46 are arranged in the lower end of the pipe 38.

In the operation of the invention, air is drawn into the crank case through the port 36, the air first being thoroughly cleaned by passing through the air cleaner at the outer end of the pipe 13. This air enters the master air cleaner through pipe 41 into the thimble 14 and passes through the passages defined by the slits 15 in the thimble. Air also enters the cleaner between the pipe 41 and the thimble 14 without passing through the crank case. All of this air passes downward through the slits 18 of the trap 17 and collects globules of oil in its passage through the oil in the fluid chamber or reservoir 20.

Air passing upward carries with it this oil, some of which is distributed over the inner wall of the casing 10. The air and oil carried thereby passes through the slots 28 in the annulus 27 and upward between the inner edge of the baffle 30 and the funnel 25 and past the upper edge of the funnel between said edge and the casing. Some of the oil will drop downward and be collected upon the under face of the baffle 30 and will gravitate to the wall of the casing 10, while some of the oil will strike the outer wall of the funnel 25 and will gravitate down this wall through the opening 23 into the fluid distributing chamber defined by the walls 21 and 22. These walls are concavo convex and the wall 22 is provided at its outer edge with spaced openings 47 so that oil or moisture collected in the chamber between the walls 21 and 22 will overflow through the openings 47 and be distributed over the bottom of the wall 22 and over the inside of the trap 17. A thorough coating of oil upon the various parts within the trap will thus be effected so as to cause dust and fine particles of dirt passing into the trap to adhere to the walls.

By removing the cover 33, all of the elements within the casing except the thimble 14 may be removed as a unit.

After the air has passed through the trap 10 and the port 36 due to the suction of the engine, this suction draws the air longitudinally through the crank case and out of the crank case through the pipe 38 into the pipe 40 and through the air cleaner in the manner previously described, and its pipe 12 into the carbureter 37 and into the engine cylinders. The air will be thoroughly cleaned in its passage through the air cleaners, and in addition, a circulation of air will be set up through the crank case which will act to materially prevent heating and consequent breaking down of the oil within the crank case. In addition, this air will pick up oil vapors from the crank case and carry them with the fuel mixture into the cylinders of the engine. Accumulation of carbon will thus be prevented, while the walls of the cylinders, as well as the pistons and piston rings will be thoroughly lubricated.

The invention is susceptible of various changes in its form, proportions and minor details of construction and the right is herein reserved to make such changes as properly fall within the scope of the appended claims.

Having described the invention what is claimed is:—

1. An air cleaner comprising a housing having an inlet, an outlet spaced from the inlet and adapted for communication with a source of suction, an inwardly extending flange surrounding the inlet and providing a fluid reservoir between the flange and housing, an air trap located within the housing between the inlet and outlet, spaced walls at the top of the trap defining a fluid distributing chamber, one of said walls having means to divert the fluid into the fluid distributing chamber, and means to direct the fluid from said chamber to the walls of the trap.

2. An air cleaner comprising a housing having an inlet, an outlet spaced from the inlet and adapted for connection with a source of suction, an inwardly extending flange surrounding the inlet and providing a fluid reservoir between the flange and housing, an air trap located within the housing between the inlet and outlet, spaced walls at the top of the trap defining a fluid distributing chamber, a combined baffle and funnel to direct the fluid into the fluid distributing chamber, and one of said walls having means to direct fluid from said chamber to the walls of the trap.

3. An air cleaner comprising a housing having an inlet, an outlet spaced from the inlet and adapted for connection with a source of suction, an inwardly extending flange surrounding the inlet and providing a fluid reservoir between the flange and housing, an air trap located within the housing between the inlet and outlet, spaced walls included in the top of the trap and defining a fluid distributing chamber, a funnel secured to the upper wall of the distributing chamber to direct fluid into said distributing chamber, said trap, spaced walls and funnel defining a removable unit, a handle extending from the unit to facilitate the removal and replacement of said unit, and one of said walls having means to direct the fluid from said chamber to the walls of the trap.

In testimony whereof I affix my signature.

JOHN L. GREEN.